US009455804B2

(12) United States Patent
Kim et al.

(10) Patent No.: US 9,455,804 B2
(45) Date of Patent: Sep. 27, 2016

(54) METHOD AND APPARATUS FOR PACKET RETRANSMISSION IN A MOBILE COMMUNICATION SYSTEM

(75) Inventors: Soeng Hun Kim, Yongin-si (KR); Ok Seon Lee, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 13/639,642

(22) PCT Filed: Apr. 4, 2011

(86) PCT No.: PCT/KR2011/002304
§ 371 (c)(1),
(2), (4) Date: Oct. 5, 2012

(87) PCT Pub. No.: WO2011/126242
PCT Pub. Date: Oct. 13, 2011

(65) Prior Publication Data
US 2013/0021982 A1 Jan. 24, 2013

(30) Foreign Application Priority Data
Apr. 6, 2010 (KR) .................. 10-2010-0031389

(51) Int. Cl.
*H04W 4/00* (2009.01)
*H04L 1/18* (2006.01)
(52) U.S. Cl.
CPC .......... *H04L 1/1887* (2013.01); *H04L 1/1864* (2013.01); *H04L 1/1877* (2013.01)

(58) Field of Classification Search
CPC ..... H04L 1/18; H04L 1/1812; H04L 1/1816; H04L 1/1819; H04L 1/1848; H04L 1/1851; H04L 1/188; H04L 1/1886; H04L 1/1887
USPC ........ 370/328–329, 335–336, 338, 342–343, 370/345, 389, 400–401, 428–429, 441–442, 370/448, 465, 478–480, 498
See application file for complete search history.

(56) References Cited

U.S. PATENT DOCUMENTS 6,240,083 B1 * 5/2001 Wright et al. ................ 370/348
6,697,331 B1 * 2/2004 Riihinen et al. .............. 370/236
(Continued)

OTHER PUBLICATIONS

ZTE, "Discussion on contention resolution of CB transmission", 3GPP TSG RAN WG2 #69, R2-101101, Feb. 22-26, 2010.
(Continued)

*Primary Examiner* — Kevin Mew
(74) *Attorney, Agent, or Firm* — Jefferson IP Law, LLP

(57) ABSTRACT

The present invention relates to a packet retransmission method of a terminal accessing a base station in contention-based access mode, and the method includes transmitting an uplink packet to the base station; receiving, when the base station fails decoding the uplink packet, a retransmission request message transmitted by the base station; and initiating, when the retransmission request message is received, a Radio Link Control (RLC) retransmission. According to the present invention, the terminal operating in contention-based access mode initiates RLC retransmission in reception of an HARQ NACK from the base station. Accordingly, it is possible to perform the RLC retransmission immediately without necessity of waiting for the expiry of HARQ RTT as in the HARQ retransmission, resulting in reduction of packet retransmission delay.

13 Claims, 13 Drawing Sheets

(56) References Cited

U.S. PATENT DOCUMENTS

| | | | |
|---|---|---|---|
| 8,018,945 B2* | 9/2011 | Zhang et al. | 370/394 |
| 8,416,784 B2* | 4/2013 | Kim et al. | 370/394 |
| 8,605,606 B2* | 12/2013 | Terry et al. | 370/252 |
| 8,625,486 B2* | 1/2014 | Wang et al. | 370/328 |
| 2003/0073435 A1* | 4/2003 | Thompson et al. | 455/428 |
| 2003/0223452 A1* | 12/2003 | Toskala et al. | 370/442 |
| 2005/0135329 A1* | 6/2005 | Lee | H04L 1/1812 370/349 |
| 2006/0045032 A1* | 3/2006 | Hamada | H04B 7/26 370/278 |
| 2007/0047513 A1* | 3/2007 | Anderson | 370/345 |
| 2007/0153672 A1* | 7/2007 | Terry et al. | 370/206 |
| 2007/0275656 A1* | 11/2007 | Chang | H04L 1/08 455/9 |
| 2008/0043771 A1* | 2/2008 | Cho et al. | 370/431 |
| 2008/0096571 A1* | 4/2008 | Pedersen et al. | 455/450 |
| 2008/0225776 A1* | 9/2008 | Alanara | H04L 1/189 370/315 |
| 2008/0253326 A1* | 10/2008 | Damnjanovic | 370/329 |
| 2009/0046650 A1* | 2/2009 | Dalsgaard | H04L 1/1812 370/329 |
| 2009/0046713 A1* | 2/2009 | Teague | H04L 1/1854 370/389 |
| 2009/0100310 A1* | 4/2009 | Yoo | H04L 1/1819 714/748 |
| 2009/0186624 A1* | 7/2009 | Cave et al. | 455/450 |
| 2009/0196421 A1* | 8/2009 | Okuda | H04L 9/0637 380/270 |
| 2009/0207802 A1* | 8/2009 | Lee et al. | 370/329 |
| 2009/0238066 A1* | 9/2009 | Cheng | H04L 1/0067 370/216 |
| 2009/0296667 A1 | 12/2009 | Tajima et al. | |
| 2009/0327828 A1* | 12/2009 | Ojala et al. | 714/749 |
| 2010/0017672 A1* | 1/2010 | Suga | H04B 7/2606 714/748 |
| 2010/0027460 A1* | 2/2010 | Kim et al. | 370/315 |
| 2010/0088570 A1* | 4/2010 | Choi | H04L 1/1812 714/751 |
| 2010/0111029 A1* | 5/2010 | Chou et al. | 370/329 |
| 2010/0165939 A1* | 7/2010 | Lin | H04L 5/0053 370/329 |
| 2010/0182951 A1* | 7/2010 | Park | H04L 1/0003 370/328 |
| 2010/0284362 A1* | 11/2010 | Tajima et al. | 370/329 |
| 2011/0034175 A1* | 2/2011 | Fong | H04B 7/024 455/450 |
| 2011/0044239 A1* | 2/2011 | Cai | H04W 72/042 370/328 |
| 2011/0305213 A1* | 12/2011 | Lohr et al. | 370/329 |
| 2012/0014342 A1* | 1/2012 | Suzuki | H04W 4/20 370/329 |
| 2012/0269137 A1* | 10/2012 | Kang et al. | 370/329 |
| 2012/0300744 A1* | 11/2012 | Larmo et al. | 370/329 |

OTHER PUBLICATIONS

ETRI, "The handling of CB uplink transmission", 3GPP TSG RAN WG2 #69, R2-101305, Feb. 22-26, 2010.

Motorola, "Retransmissions for Contention Based access", 3GPP TSG RAN WG2 #69, R2-101392, Feb. 22-26, 2010.

Catt, "The Feedback and Retransmission for the Contention Based", 3GPP TSG RAN WG2 #69, R2-101059, Feb. 22-26, 2010.

\* cited by examiner

METHOD AND APPARATUS FOR PACKET RETRANSMISSION IN A MOBILE COMMUNICATION SYSTEM

BACKGROUND OF THE INVENTION

1. Field of the Invention

The present invention relates to a packet retransmission method and apparatus in a mobile communication system. More particularly, the present invention relates to a method and apparatus for processing, when a base station requests a terminal for packet retransmission in Contention-Based Access, the packet retransmission request.

2. Description of the Related Art

Mobile communication systems developed to provide the subscribers with voice communication services on the move. With the rapid advance of technologies, the mobile communication systems have evolved to support high speed data communication services as well as the standard voice communication services. However, the resource shortage and user requirement for higher speed data services spurs the evolution of the mobile communication system to more advanced system.

For this purpose, researches are being conducted in various aspects and, particularly, focused on the retransmission process in the situation of packet transmission failure to guarantee communication reliability.

As the retransmission technique, there are HARQ (Hybrid Automatic Repeat reQuest) operating at physical layer level and ARQ (Automatic Repeat reQuest) operating at RLC (Radio Link Control) layer level. The ARQ technique is of correcting errors through data retransmission, while the HARQ technique is of attempting error correction to the received data and determining whether to perform retransmission using error detection code.

Meanwhile, when the terminal (transmitter) transmits a packet to a base station (receiver), the transmission can be performed in one of contention free access using the resource dedicated to the terminal and contention-based access using the resource accessible by multiple terminals.

However, there is no packet retransmission technique developed for use in the contention-based access yet. In the case of using the legacy HARQ retransmission method in the contention-based access, the terminal has to waits HARQ RTT (Round Trip Time) of 8 ms to perform retransmission since the detection of the retransmission necessity, resulting in retransmission delay problem.

Also, the HARQ retransmission mechanism operates in such a way that the retransmission is performed on the same uplink resource as the previous attempt in the same process. Accordingly, if the HARQ retransmission mechanism is applied to the contention-based access procedure, the terminals attempt retransmission using the same resources so as to cause collision.

There is therefore a need of an efficient packet retransmission method for use in the contention-based access procedure.

DISCLOSURE OF INVENTION

Technical Problem

The present invention has been made in an effort to solve the above problems and it is an object of the present invention to provide a packet retransmission method and apparatus for performing packet retransmission efficiently in the content-based access procedure.

Solution to Problem

In order to solve the above problem, a packet retransmission method of a terminal performing contention-based access to a base station according to the present invention includes transmitting an uplink packet to the base station; receiving, when the base station fails decoding the uplink packet, a retransmission request message transmitted by the base station; and initiating, when the retransmission request message is received, a Radio Link Control (RLC) retransmission.

Also, in order to solve the above problem, a terminal for transmitting a packet to a base station according to the present invention includes an RF communication unit which transmits an uplink packet to the base station and receives, when the base station fails decoding the uplink packet, a retransmission request message transmitted by the base station; and a local retransmission controller which controls initiating, when the retransmission request message is received, a Radio Link Control (RLC) retransmission.

Advantageous effects

According to the present invention, the terminal operating in contention-based access mode initiates RLC retransmission in reception of an HARQ NACK from the base station. Accordingly, it is possible to perform the RLC retransmission immediately without necessity of waiting for the expiry of HARQ RTT as in the HARQ retransmission, resulting in reduction of packet retransmission delay.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
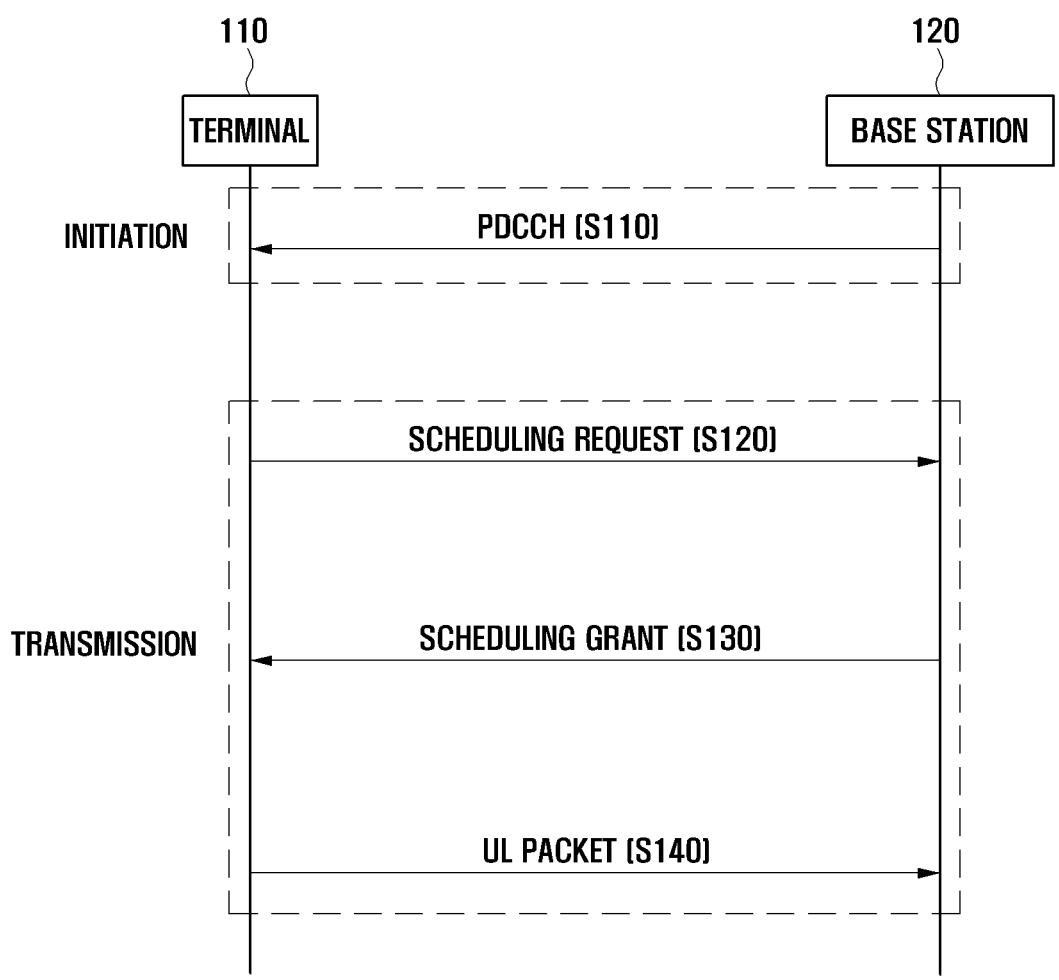
FIG. 1 is a signaling diagram illustrating a packet transmission procedure from a terminal 110 to a base station 120 in the contention-free access mode.

FIG. 1 is a signaling diagram illustrating a packet transmission procedure from a terminal 110 to a base station 120 in the contention-free access mode.

If there is the packet to be transmitted by the terminal 110, the base station 120 first allocates resource for Scheduling Request (SR) of the terminal 110 through Physical Downlink Control Channel (PDCCH) at step S110. If the SR transmission occasion arrives, the terminal 110 requests the base station 120 for uplink resource at step S120.

Upon receipt of the request, the base station 120 allocates uplink resource (Scheduling Grant, SG) to the corresponding terminal 110 at step S130. The terminal 110 transmits uplink packets to the base station 120 through the allocated uplink resource at step S140.

Figure 2:
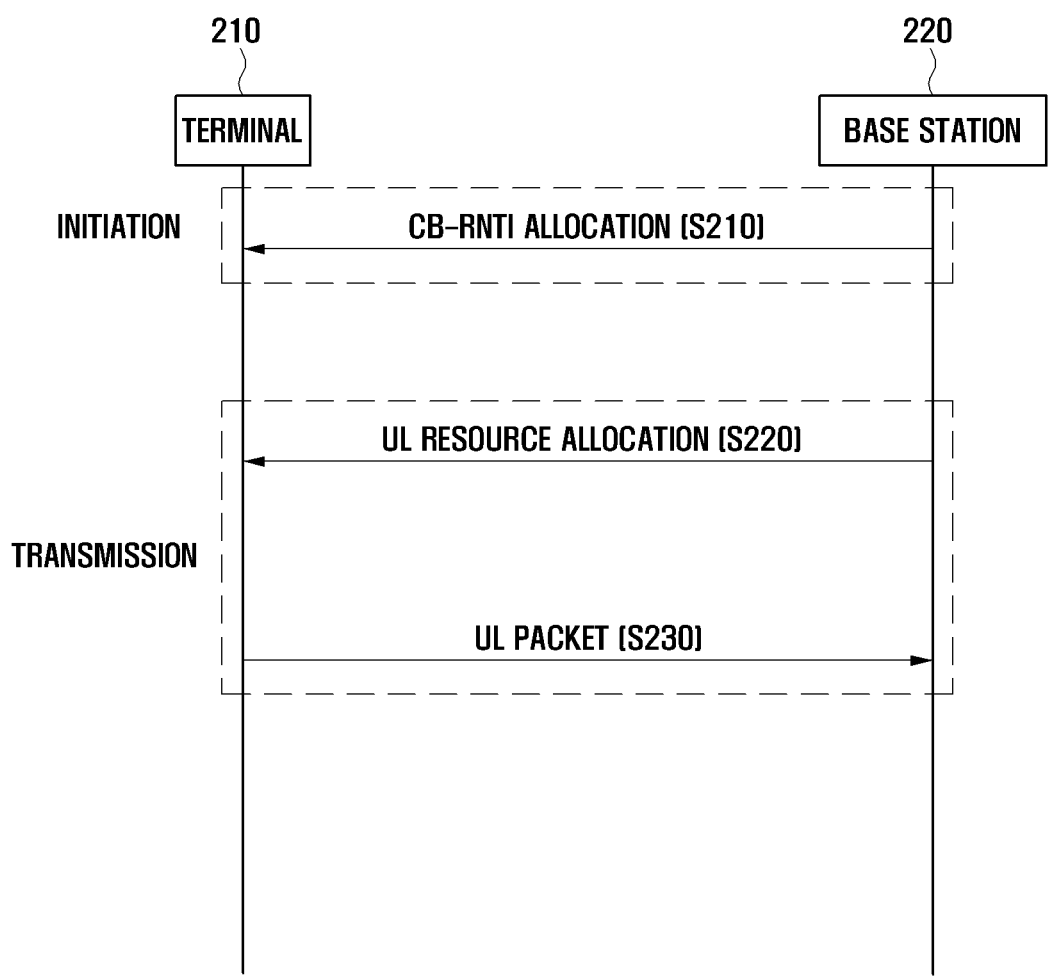
FIG. 2 is a signaling diagram illustrating a packet transmission procedure from a terminal 210 to a base station 220 in the contention-based access mode.

FIG. 2 is a signaling diagram illustrating a packet transmission procedure from a terminal 210 to a base station 220 in the contention-based access mode.

The base station 220 first allocates CB-RNTI (Contention Based-Radio Network Temporary Identifier) to the terminal 210 capable of contention-based access at step S210. The base station 220 allocates uplink resource to the terminal 210 allocated the CB-RNTI through PDCCH at step S220. The terminal 210 transmits uplink packet to the base station 220 through the allocated uplink resource at step S230.

As shown in FIGS. 1 and 2, the contention-based access method is capable of shortening the uplink access time by reducing signaling as compared to the content-free access method.

Conventionally, if it fails to decode the packet transmitted by the terminal (transmitter), the base station transmits HARQ NACK to the terminal for HARQ retransmission of the packet failed in decoding in the case of HARQ retransmission. Also, in the case of ARQ retransmission, the base station feeds back the RLC Status Report to the terminal for ARQ retransmission of the packet failed in decoding.

The HARQ retransmission procedure and ARQ retransmission procedure are described briefly herein after.

Figure 3:
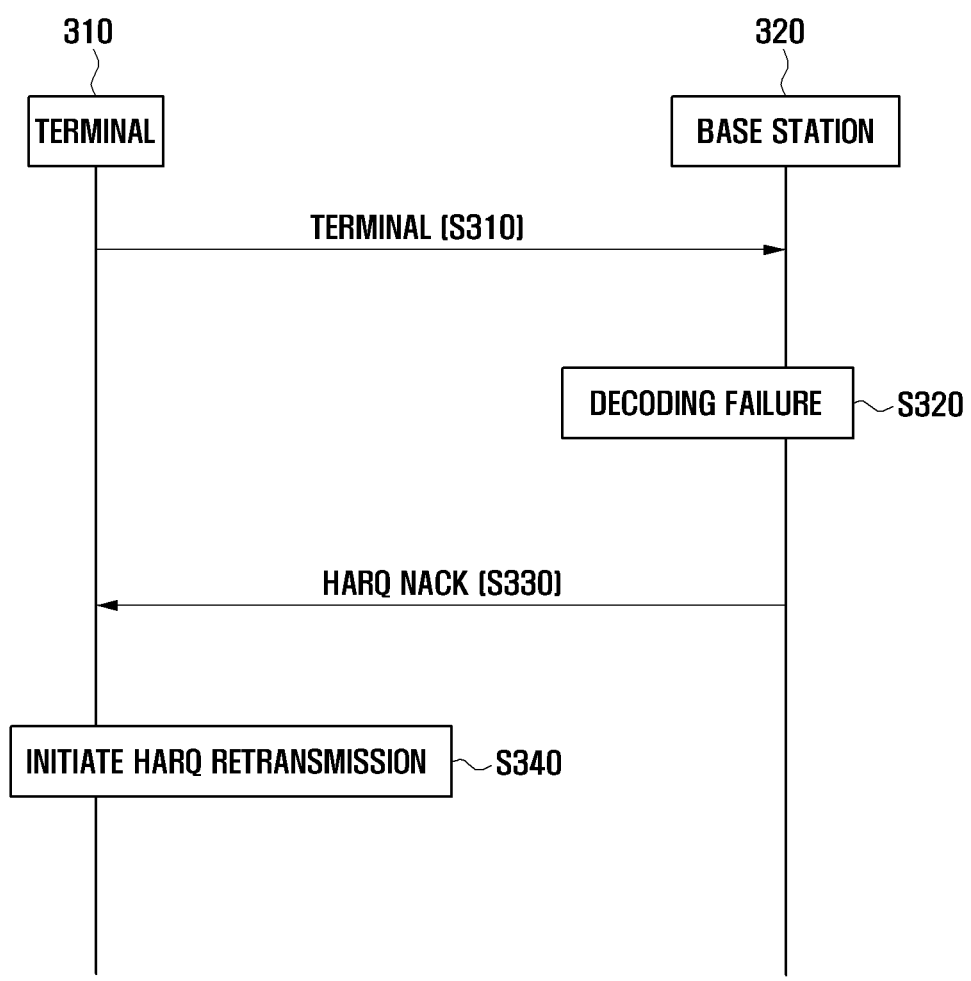
FIG. 3 is a signaling diagram illustrating the conventional HARQ retransmission procedure.

FIG. 3 is a signaling diagram illustrating the conventional HARQ retransmission procedure.

The terminal 310 first transmits an uplink packet to the base station 320 through allocated uplink resource at step S310. The base station 320 decodes the uplink packet received form the terminal 310. At this time, the base station 320 may fail to decode the uplink packet due to a reason such as channel quality degradation and contention among terminals at step S320. In this case, the base station 320 transmits an HARQ NACK to the terminal S330.

If the HARQ NACK is received from the base station 320, the terminal 310 starts HARQ retransmission at step S340. In more detail, if the HARQ NACK is received, the terminal 310 starts HARQ retransmission using the same resource as the initial transmission at the subframe after HARQ RTT of 8 ms. The terminal 310 performs the HARQ retransmission using the resource allocated by means of a separate PDCCH.

Figure 4:
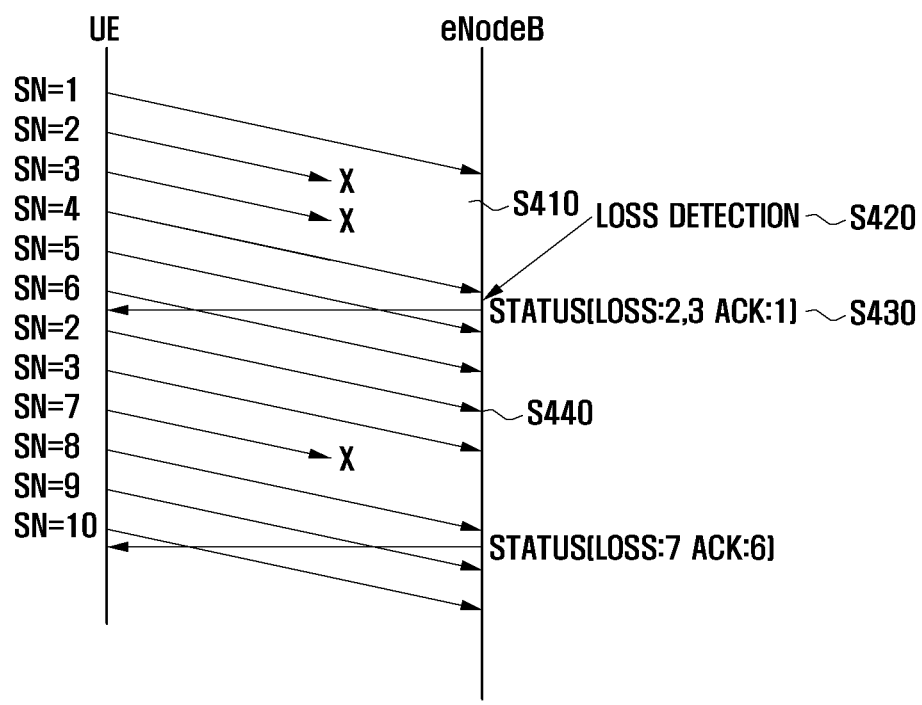
FIG. 4 is a signaling diagram illustrating the conventional ARQ retransmission procedure.

FIG. 4 is a signaling diagram illustrating the conventional ARQ retransmission procedure.

As aforementioned, the ARQ retransmission is performed on the RLC layer on which the receiver sends the RLC Status Report to the transmitter periodically to notify of data loss for reliable data transmission. The Status Report may include acknowledgement report confirming successful receipt of the data and data retransmission request report for requesting the transmitter to retransmit the lost data.

Meanwhile, the RLC layer is positioned between MAC layer and Radio Resource Control (RRC) layer. The RLC layer is capable of operating in one of Transparent Mode, Unacknowledge Mode, and acknowledgement mode. The Transparent Mode is mainly used for voice service, and the Unacknowledge Mode is used for visual conference or video call service. The Acknowledge Mode (hereinafter, referred to as AM mode of RLC protocol is used for interactive services or background services and possible to be used for streaming services.

In the AM mode of the RLC protocol, the data (or data PDU) is transmitted in in-sequence delivery manner. That is, in the AM mode of the RLC protocol, the data are transmitted from the transmitter to the receiver in the order of sequence numbers.

By referencing the above described principles, a description is made of the ARQ retransmission procedure with reference to FIG. 4.

The terminal 410 operating in RLC AM mode transmits uplink packets to the base station 420 in the order of sequence numbers. Here, it is assumed that the transmission of the packets having sequence number 2 and 3 fail at step S410. In this case, the base station 420 detects the uplink packet transmission failure at step S420 and transmits an RLC status report message to the terminal 410 at step S430. The RLC status report message transmitted at step S430 includes the information that it has received the packet of sequence number 1 successfully but failed receiving the packets of sequence numbers 2 and 3.

If the RLC status report message is received from the base station 420, the terminal 410 recognizes that the base station has failed receiving the packets of sequence numbers 2 and 3 and retransmits the corresponding packets at step S440.

As aforementioned, the terminal is capable of accessing the base station in contention-based or contention-free access mode, and the retransmission can be performed in HARQ or ARQ mechanism.

Until now, however, there is no retransmission technique developed for use in the contention-based access mode. In the case of using the legacy HARQ retransmission method in the contention-based access, the terminal has to waits HARQ RTT (Round Trip Time) of 8 ms to perform retransmission since the detection of the retransmission necessity, resulting in retransmission delay problem. Also, the HARQ retransmission mechanism operates perform retransmission with the same uplink resource as the previous attempt in the same process. Accordingly, if the HARQ retransmission mechanism is applied to the contention-based access procedure, the terminals attempt retransmission using the same resources so as to cause collision.

A description is made of an efficient packet retransmission method for use in contention-based access mode according to an embodiment of the present invention hereinafter.

Figure 5:
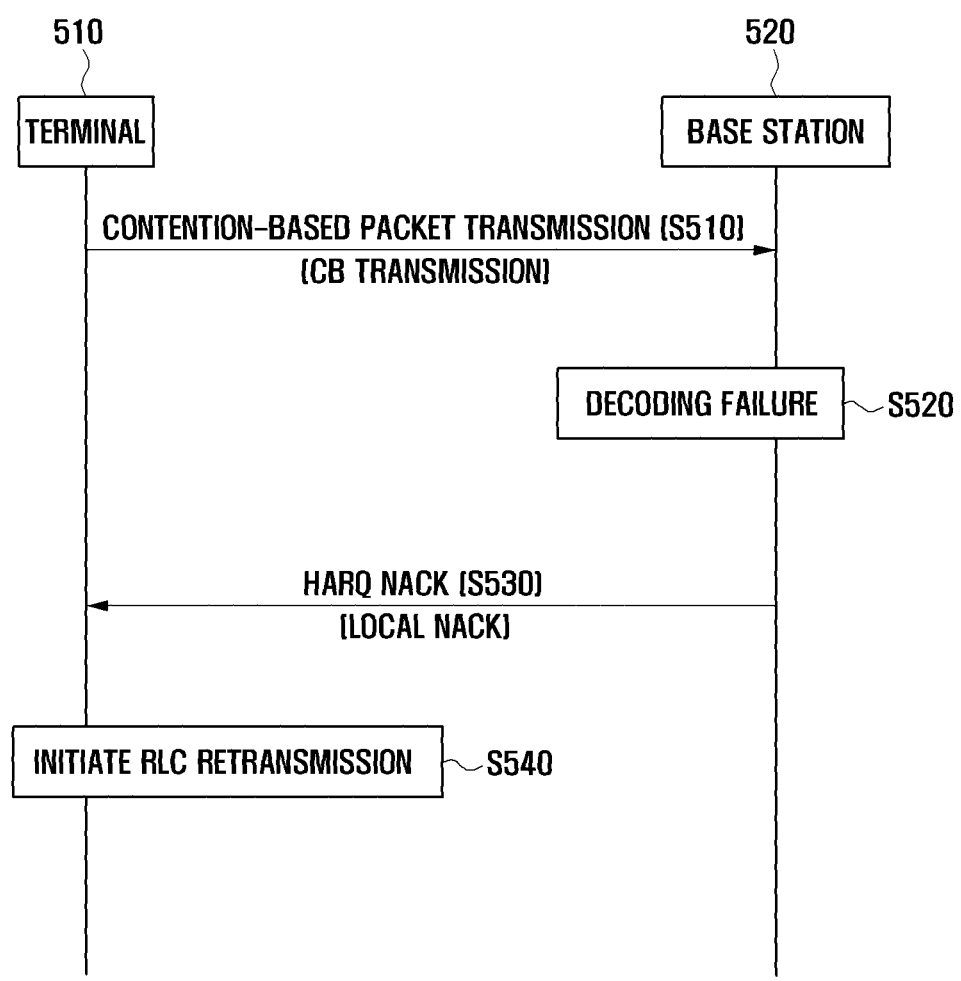
FIG. 5 is a signaling diagram illustrating a packet retransmission method for the contention-based access mode according to an embodiment of the present invention.

FIG. 5 is a signaling diagram illustrating a packet retransmission method for the contention-based access mode according to an embodiment of the present invention.

The terminal 510 first transmits an uplink packet to the base station in the contention-based access mode at step S510. The base station 520 receives the packet and attempts decoding. If the decoding is successful, the base station 520 transmits HARQ ACK to the terminal 510 and, otherwise the decoding fails, transmits HARQ NACK to the terminal 510. In the embodiment of FIG. 5, it is assumed that the base station 520 has failed decoding the packet.

The base station 520 detects that it has failed to decode the received packet at step S520 and transmits a retransmission request message (HARQ NACK) to the terminal 510 at step S530. If the HARQ NACK is received, the terminal 510 initializes the RLC retransmission rather than initiate HARQ retransmission.

According to this embodiment of the present invention, the terminal 510 initiates the RLC retransmission through a procedure different from that of conventional ARQ since the RLC retransmission is initialized by the HARQ NACK transmitted by the base station 510. In this embodiment of the present invention, the HARQ NACK initializing the RLC retransmission is referred to as local NACK, and the RLC retransmission initialized by the local NACK is referred to as Local Retransmission.

Here, the embodiment of FIG. 5 is directed to the AM mode in which the data (or Protocol Data Unit, PDU) are transmitted in the order of sequence numbers.

Figure 6:
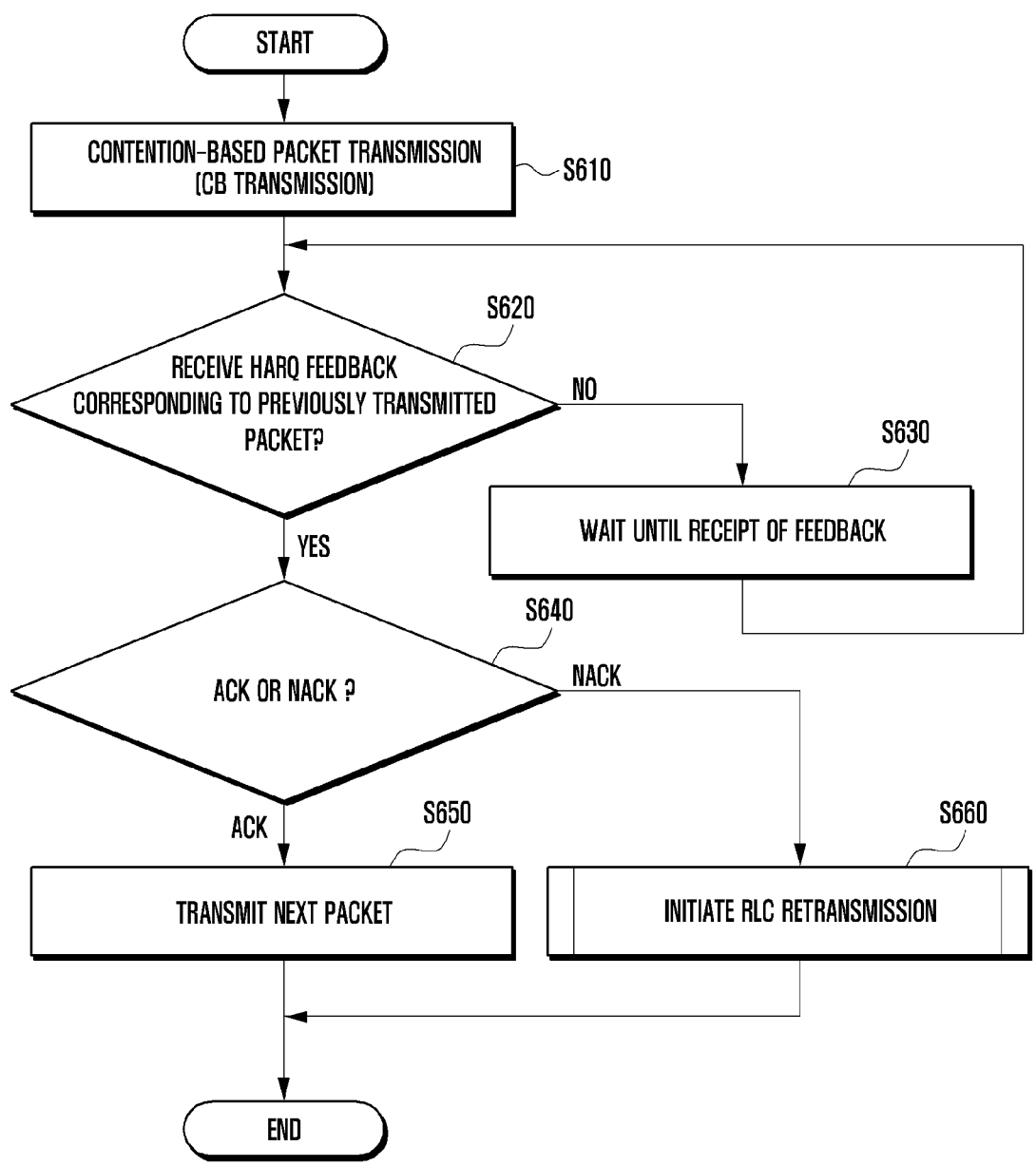
FIG. 6 is a flowchart illustrating a procedure of initiating the local retransmission of the terminal 510 according to an embodiment of the present invention.

FIG. 6 is a flowchart illustrating a procedure of initiating the local retransmission of the terminal 510 according to an embodiment of the present invention.

The terminal 510 first transmits to the base station 520 the uplink packets through the uplink resource in the contention-based access mode at step S610. According to an embodiment of the present invention, the terminal 510 determines whether an HARQ feedback corresponding to the previously transmitted packet is received at step S620. This is to avoid, when retransmission has been required due to the collision and thus the packet has been transmitted using the same uplink resource, collision with other terminals that are transmitting packet on the same uplink resource where the collision has occurred already.

Due to this reason, the terminal 510 determines whether the HARQ feedback corresponding to the previously transmitted packet is received and, if not received, waits until the feedback is received at step S630.

If the HARQ feedback is received, the terminal 510 determines whether the received HARQ feedback is HARQ ACK or HARQ NACK at step S640. If HARQ ACK has been received, the terminal 510 transmits the next uplink packet at step S650. Otherwise, the HARQ NACK has been received, the terminal 510 initiates the local retransmission (i.e. RLC retransmission) at step S660 as proposed in the present invention.

Figure 7:
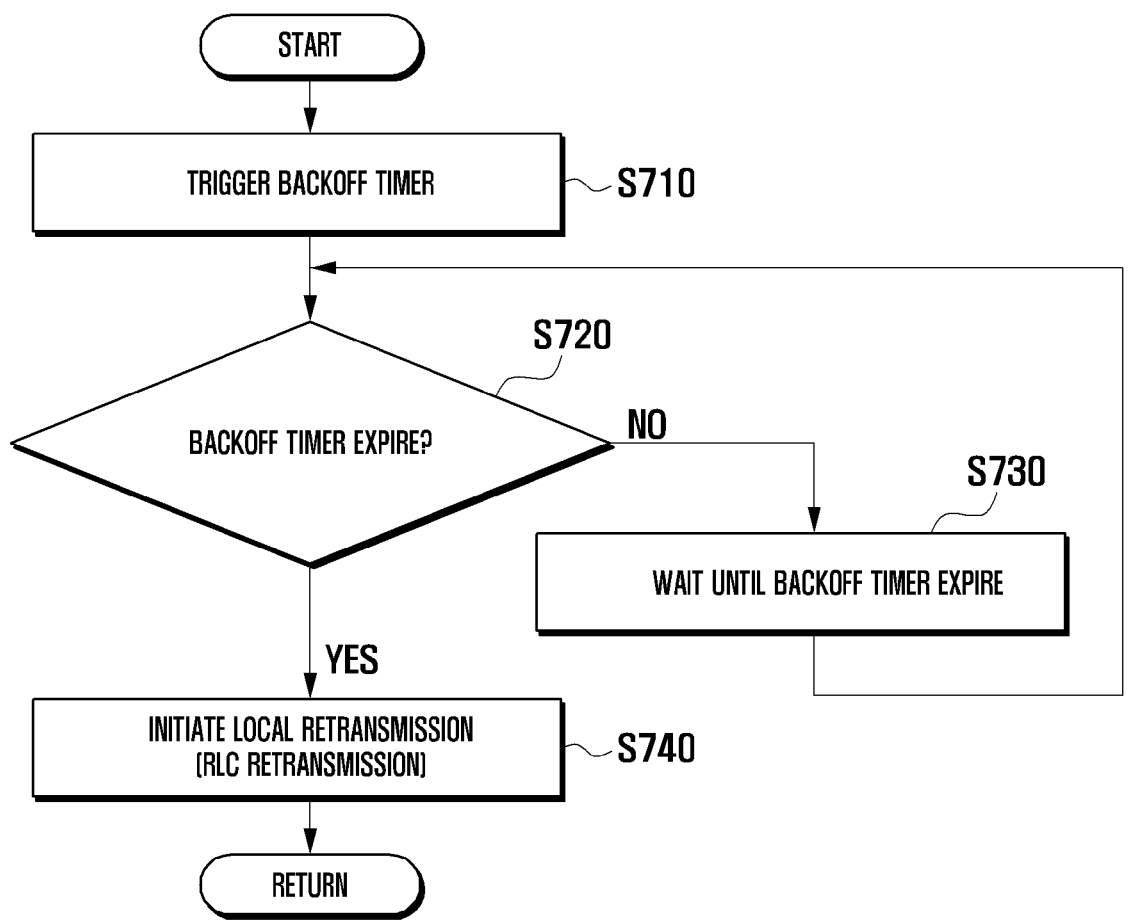
FIG. 7 is a flowchart illustrating details of step S660 of FIG. 6 for the terminal to initiate the local retransmission according to an embodiment of the present invention.

FIG. 7 is a flowchart illustrating details of step S660 of FIG. 6 for the terminal to initiate the local retransmission according to an embodiment of the present invention.

When initiating the local retransmission, the terminal 510 triggers a backoff timer at step S710. This is to avoid reoccurrence of the collision with other terminals transmitting packets on the same uplink resource that is caused when the terminal 510 transmitted the packet in the contention-based access mode and then received the HARQ NACK attempts retransmission on the same uplink resource.

If the backoff timer is triggered, the terminal 510 determines whether the backoff timer has expired at step S720. If the backoff timer has expired, the terminal 510 waits until the backoff timer expires at step S730. Otherwise, if the backoff timer has expired, the terminal 510 initiates the local retransmission (RLC retransmission) at step S740 as proposed in the present invention.

Figure 8:
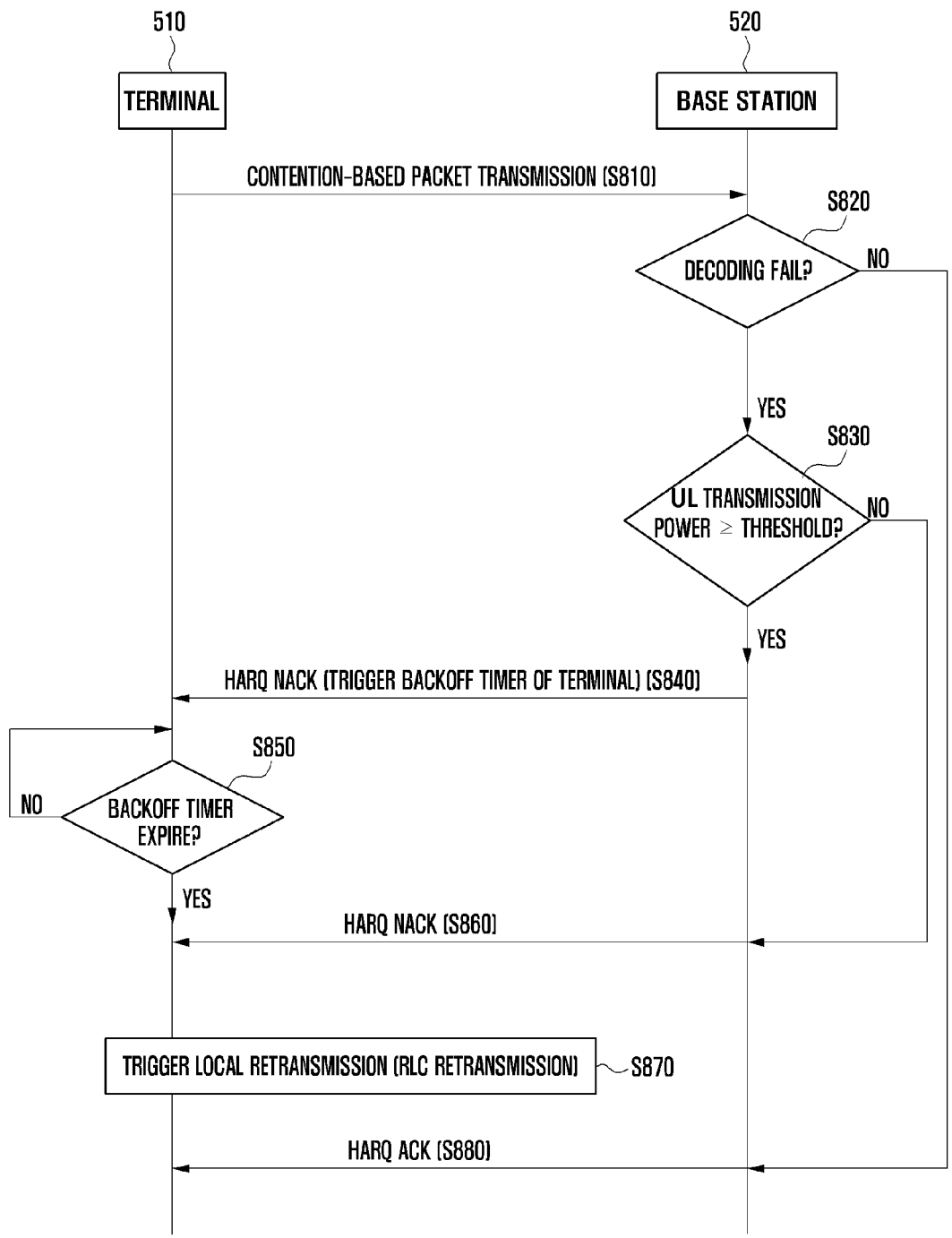
FIG. 8 is a signaling diagram illustrating a procedure for triggering backoff timer based on the uplink channel signal strength according to an embodiment of the present invention.

FIG. 8 is a signaling diagram illustrating a procedure for triggering backoff timer based on the uplink channel signal strength according to an embodiment of the present invention.

The terminal 510 first transmits a packet to the base station 520 in the contention-based access mode at step S810. Upon receipt of the packet, the base station 520 attempts decoding the packet and determines whether the packet is decoded successfully at step 820. If the packet is decoded successfully, the base station 520 transmits an HARQ ACK to the terminal 510 at step S880 and requests for the next uplink packet transmission.

Otherwise, if it fails to decode the packet, the base station 520 determines whether the uplink transmission power of the terminal 510 is equal to or greater than a predetermined threshold at step S830. This is to regard the case where the uplink transmission power of the terminal 510 is less than the threshold as the decoding failure caused by the channel quality degradation and the case where the uplink transmission power is equal to or greater than the threshold as the decoding failure caused by access collision with other terminals that are transmitting on the same uplink resource. In the present invention, the backoff timer is triggered only by the decoding failure caused by access collision.

For this purpose, if the uplink transmission power is equal to or greater than the threshold, the base station 520 determines that the reason of the decoding failure is access collision with other terminals and the procedure goes to step S840. The base station 520 transmits the HARQ NACK including the control information triggering the backoff timer to the terminal 510 at step S840. In this case, the terminal 510 initiates local retransmission at step S870 only when the backoff timer expires at step S850.

Otherwise, if the uplink transmission power is less than the threshold, the base station 520 determines that the reason of the decoding failure is channel quality degradation and the procedure goes to step S860. The base station 520 transmits the HARQ NACK requesting for local retransmission at step S860. In this case, the terminal 510 initiates the local retransmission at step S870 without triggering the backoff timer.

Figure 9:
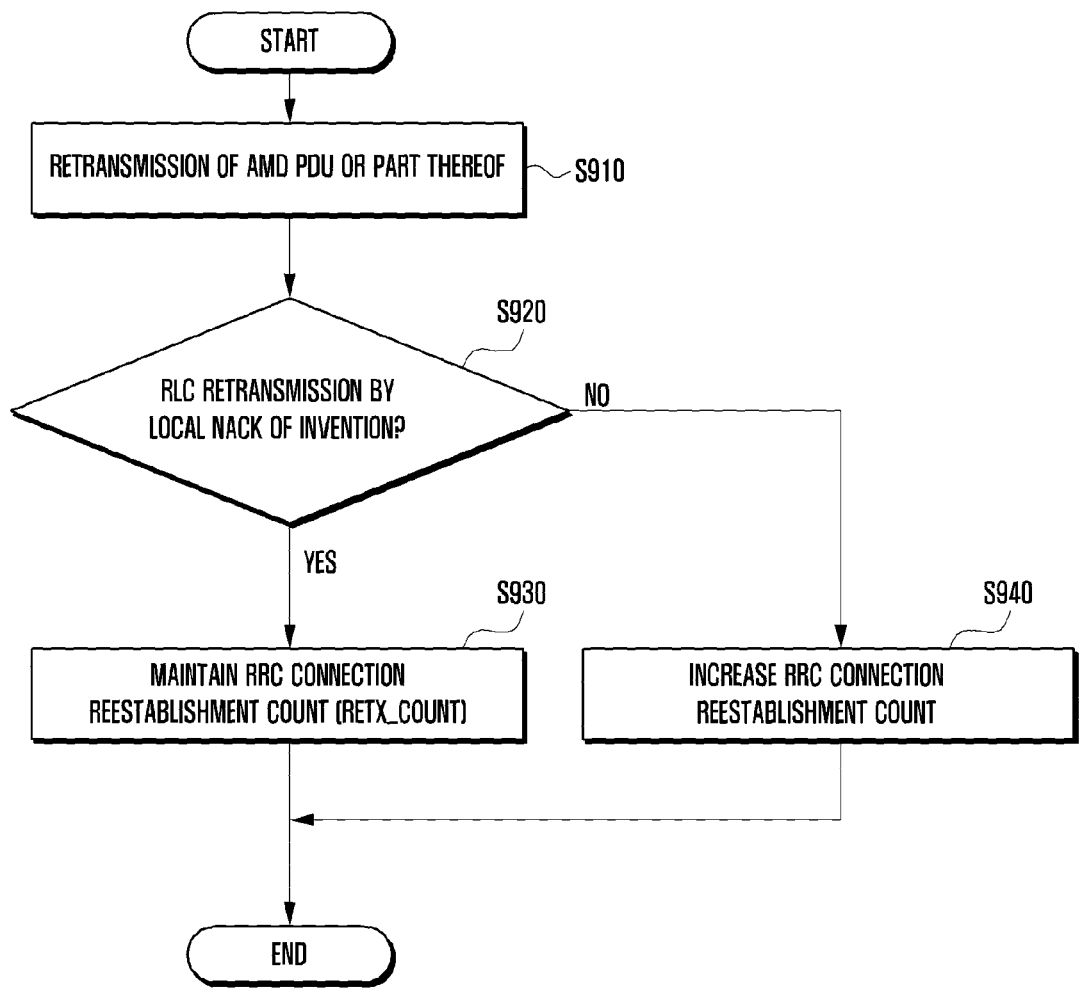
FIG. 9 is a flowchart illustrating a method having no limit of retransmission times of the terminal 510 in the contention-based access mode according to an embodiment of the present invention.

FIG. 9 is a flowchart illustrating a method having no limit of retransmission times of the terminal 510 in the contention-based access mode according to an embodiment of the present invention.

In the conventional contention-free access mode, if the number of failures of retransmissions performed on the allocated resource is equal to or greater than a predetermined value, the terminal determines that there is a problem in RRC connection and then performs RRC connection reestablishment procedure. For this purpose, the terminal counts a number of packet retransmission using an RRC connection reestablishment count (RETX_COUNT) as a reference to determine the timing for triggering the RRC connection reestablishment and, if the count reaches a predetermined value, the RRC connection reestablishment procedure is initiated. In the case of using the contention-based access mode, the transmission failure may occur due to collision even though there is no problem on the RRC connection. If the RRC connection reestablishment count is incremented by the retransmission triggered by the physiological limitation of the contention-based access mode even though there is no problem in the RRC connection, this causes a problem of incurring unnecessary RRC connection reestablishment. In the present invention, when retransmission is triggered, the terminal determines whether the retransmission is caused by the use of the contention-based access method to increment the RRC connection reestablishment count selectively.

If it is recognized, at step S910, that retransmission of AM PDU or a part of the AM PDU is necessary, the terminal 510 determines whether the retransmission is triggered by the local NACK of the present invention at step S920. That is, the terminal determines whether the reason of the retransmission is that the AM PDU or the data including a part of the AM PUD has been transmitted in the contention-based access mode and the HARQ NACK is transmitted in correspondence to the data. For reference, the legacy terminal determines whether the retransmission of the AM PDU or a part of the AM PDU is necessary based on the status report message (STATUS PDU) transmitted by the base station.

If the reason of the retransmission is not the local NACK, the terminal 510 increases the RRC connection reestablishment count according to the conventional procedure at step S940. Otherwise, if the reason of the retransmission is the local NACK, the terminal 510 maintains the RRC connection reestablishment count at step S930.

Figure 10:
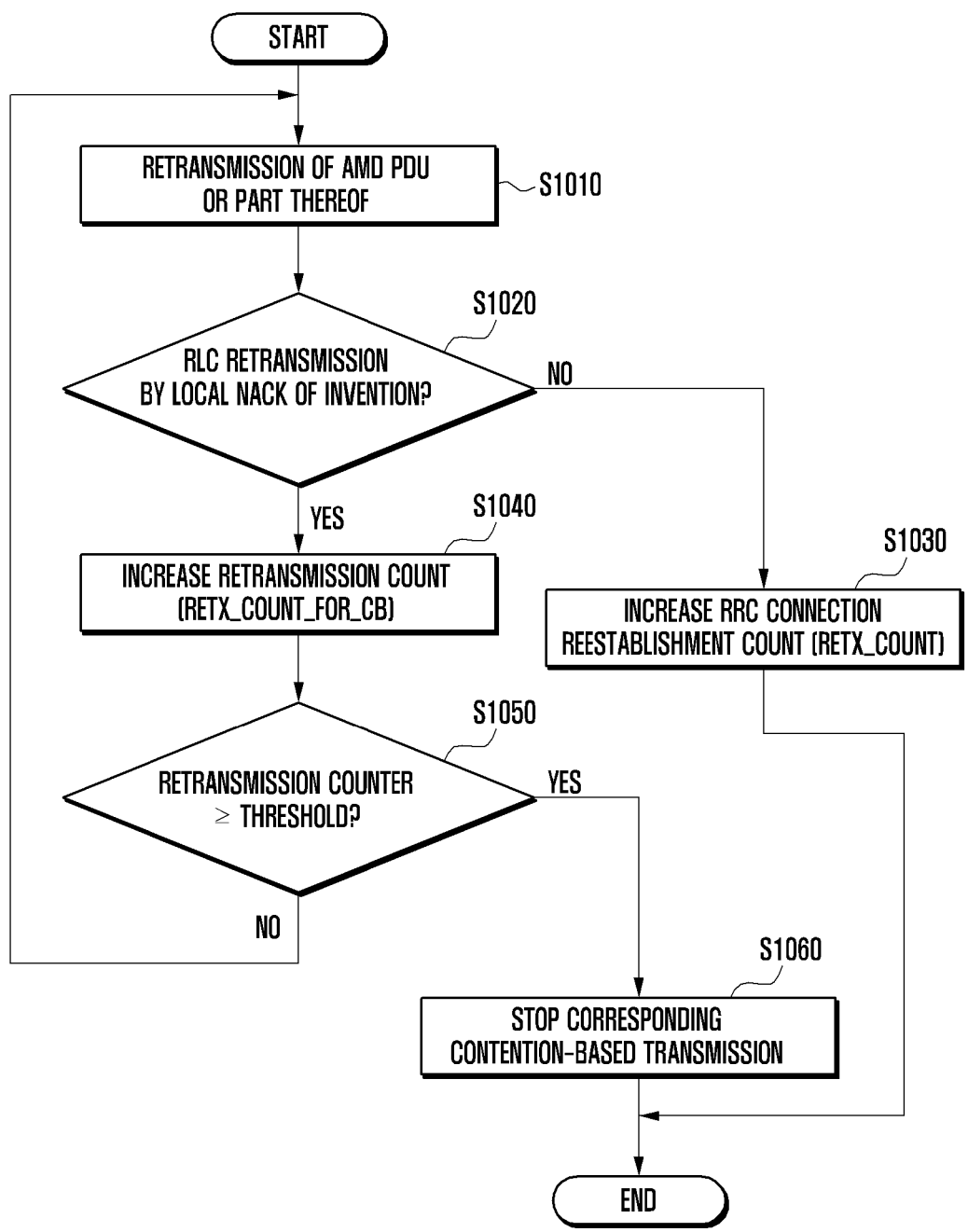
FIG. 10 is a flowchart illustrating a procedure for stopping the local retransmission using a retransmission count (RETX_COUNT_for_CB) when the number of retransmission failures of the terminal 510 is equal to or greater than a predetermined value according to an embodiment of the present invention.

FIG. 10 is a flowchart illustrating a procedure for stopping the local retransmission using a retransmission count (RETX_COUNT_for_CB) when the number of retransmission failures of the terminal 510 is equal to or greater than a predetermined value according to an embodiment of the present invention.

If the retransmission of AM PDU or a part of the AM PDU is triggered at step S1010, the terminal 510 determines whether the retransmission is caused by the local NACK of the present invention at step S1020.

If the retransmission is not caused by the local NACK, the terminal 510 increases the RRC connection reestablishment count according to the convention procedure at step S1060. Otherwise, if the retransmission is caused by the local NACK, the terminal 510 increases the retransmission count (RETX_COUNT_for_CB) of the present invention at step S1040. After updating the retransmission count, the terminal 510 determines whether the retransmission count is equal to or greater than a predetermined threshold at step S1050.

If the retransmission count is less than the threshold, the terminal 510 returns the procedure to step S1010. Otherwise, if the retransmission count is equal to or greater than the threshold, the terminal 510 stops the contention-based local retransmission of the packet at step S1060. In this case, the terminal 510 is capable of being allocated the dedicated resource from the base station 520 to transmit the corresponding packet to the base station 520 in the contention-free access mode according to an embodiment of the present invention. According to another embodiment of the present invention, the terminal 510 is capable of attempting retransmission through random access procedure.

Figure 11:
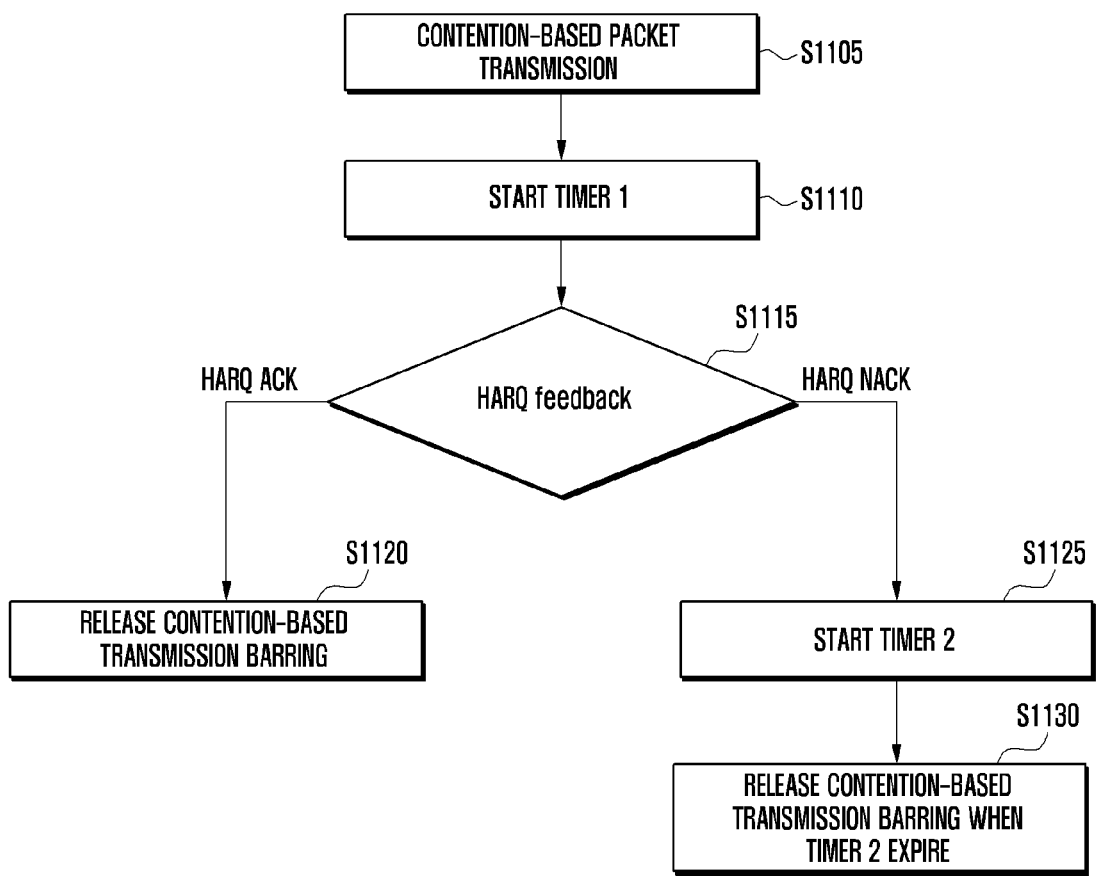
FIG. 11 is a flowchart illustrating a method for the terminal to apply backoff selectively depending on the HARQ feedback corresponding to data transmission in the contention-based access mode.

FIG. 11 is a flowchart illustrating a method for the terminal to apply backoff selectively depending on the HARQ feedback corresponding to data transmission in the contention-based access mode.

The terminal 510 transmits data in the contention-based access mode at step S1105. That is, the terminal transmits the data using the transmission resource indicated through the contention-based transmission resource. The terminal 510 starts the timer 1 at step S1110 when the HARQ feedback is received and suspends contention-based access attempt before the expiry of the timer. This is to minimize the probability of collision caused by the contention-based access. Since the HARQ feedback corresponding to the uplink data transmitted at the $n^{th}$ subframe is received at the $(n+4)^{th}$ subframe, if the data has been transmitted in the contention-based access mode at the $n^{th}$ subframe, the terminal 510 does not attempt the contention-based access before the $(n+4)^{th}$ subframe.

If the HARQ feedback is received at step S1115, the terminal 510 checks the HARQ feedback and, if the HARQ feedback is HARQ ACK, the procedure goes to step S1120, and otherwise, step S1125. If the procedure goes to step S1120, this means that the base station has received the data transmitted in the contention-based mode successfully. This can be interpreted that no collision has occurred at the corresponding time and the load of the contention-based access is not higher. Accordingly, if the procedure goes to step S1120, the terminal 510 regards that the contention-based access barring is released and, if there is data to be transmitted, transmits the data in the contention-based access mode. If the procedure goes to step S1125, this means that the base station has failed decoding the data transmitted in the contention-based mode. This can be interpreted that the probability of collision is higher and thus the terminal 510 starts a timer 2 to avoid the constant collision. The timer 2 is set to an integer selected randomly in the range of 0 to a maximum value. The terminal 510 decrements the timer by 1 at every subframe and, if the timer expires, regards that the contention-based access barring has been released and, if there is the data to be transmitted in the contention-based access mode, transmits the data in the contention-based access mode. While the timer 1 and time 2 are running, the terminal 510 regards that the contention-based access is barred.

Figure 12:
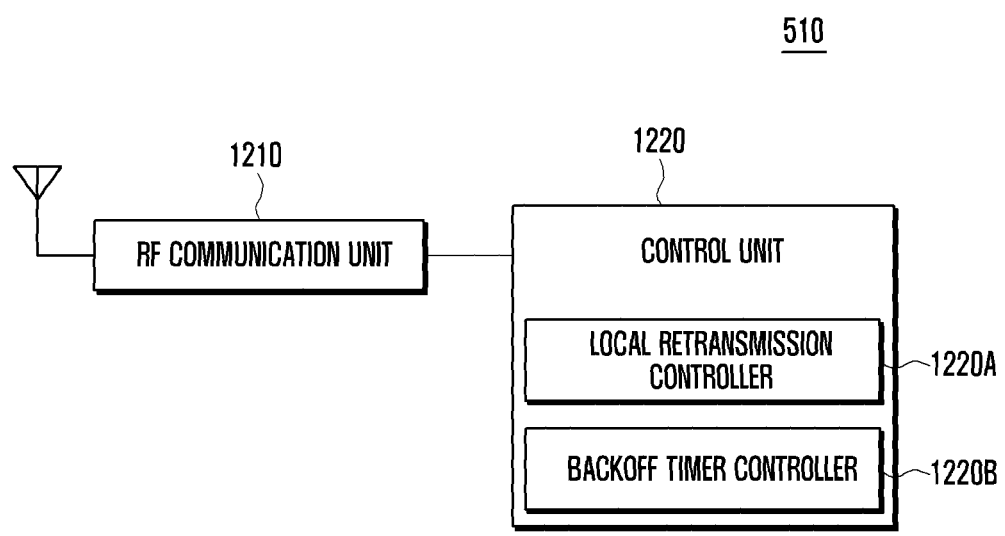
FIG. 12 is a block diagram illustrating a configuration of the terminal 510 according to an embodiment of the present invention.

FIG. 12 is a block diagram illustrating a configuration of the terminal 510 according to an embodiment of the present invention. As shown in FIG. 12 the terminal 510 of the present invention includes an RF communication unit 1210 and a control unit 1220. The control unit 1220 is capable of including a local retransmission controller 1220A and a backoff timer controller 1220B.

The RF communication unit 1210 is responsible for transmitting/receiving radio signals carrying data. The RF communication unit 1210 is capable of including an RF transmitter for up-converting and amplifying the signal to be transmitted and an RF receiver for low noise amplifying and down-converting the received signal. The RF communication unit 1210 also delivers the data received over the radio channel to the control unit 1220 and transmits the data output from the control unit 1220 through the radio channel. Particularly in an embodiment of the present invention, the RF communication unit 1210 is capable of receiving HARQ ACK or HARQ NACK transmitted by the base station 520 and transmitting retransmission packets to the base station 520 according to the local retransmission mechanism.

The control unit 1220 controls signaling among the function blocks of the terminal 510 according to an embodiment of the present invention. Although not depicted in the drawing, the control unit 1220 is capable of including a transmission data processor and a reception data processor.

The transmission data processor is capable of including a coder for encoding the signal to be transmitted, a modulator for modulating the coded signal, and a digital-analog converter for converting the modulated signal to an analog signal. Here, the coder includes a data coder for processing the packet data and an audio coder for processing the audio signal including voice. The transmission data processor outputs the coded and modulated signal to the RF communication unit 1210.

The reception data processor is capable of including an analog-digital converter for converting the analog signal to a digital signal, a demodulator for demodulating the modulated signal, and a decoder for decoding the demodulated signal. Here, the decoder includes a data decoder for processing the packet data and an audio decoder for processing the audio signal including voice.

Particularly, the control unit 1220 controls the entire local retransmission procedure and, for this purpose, is capable of further including the local retransmission controller 1220A and the backoff timer controller 1220B.

The local retransmission controller 1220A determines whether to perform the local retransmission according to an embodiment of the present invention. For this purpose, the local retransmission controller 1220A determines whether a local NACK (i.e. HARQ NACK) is transmitted by the base station in the contention-based access mode. If the local NACK is received, the local retransmission controller 1220A initializes the RLC retransmission, rather than performing HARQ retransmission, and performs the RLC retransmission. According to an embodiment of the present invention, the local retransmission controller 1220A transmits an uplink packet and waits for receiving an HARQ feedback corresponding to the transmitted packet so as to perform the next process only when the HARQ feedback is received. If the HARQ feedback is the HARQ ACK, the local retransmission controller 1220A controls to transmit the next packet to the base station 520 and, otherwise if the HARQ feedback is the HARQ NACK, controls to perform the local retransmission of the present invention.

According to an embodiment of the present invention, the local retransmission controller 1220A is capable of controlling to maintain the RRC connection reestablishment count (RETX_COUNT) value rather than increase the value.

According to another embodiment of the present invention, the local retransmission controller 1220A is callable of defining a retransmission timer (RETX_COUNT_for_CB) incrementing whenever the local retransmission occurs. The local retransmission controller 1220A is also capable of controlling to stop the local transmission when the retransmission count value is equal to or greater than a predetermined threshold value. In this case, the retransmission packet can be transmitted to the base station 520 through a random access or a dedicated resource.

Meanwhile, the control unit 1220 of the terminal 510 of the present invention is capable of including a backoff timer controller 1220B for efficient local retransmission. The backoff timer controller 1220B determines whether the control command triggering the backoff timer is received from the base station 520. The control command can be received along with the HARQ NACK. If the backoff timer initiation command is received from the base station 520, the backoff timer controller 1220B starts the backoff timer and controls to initiate the local retransmission at the expiry of the timer.

Figure 13:
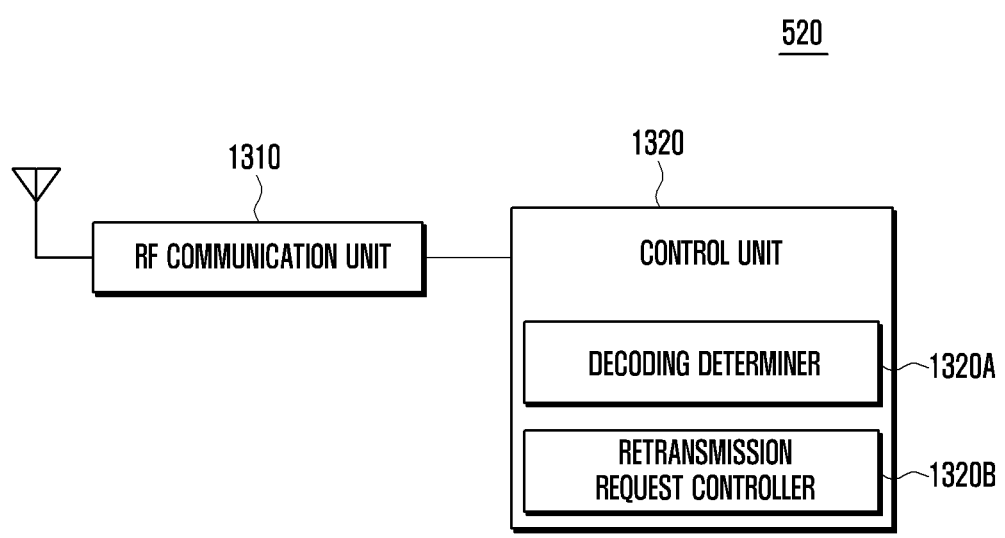
FIG. 13 is a block diagram illustrating a configuration of the base station 520 according to an embodiment of the present invention.

FIG. 13 is a block diagram illustrating a configuration of the base station 520 according to an embodiment of the present invention. As shown in FIG. 13, the base station 520 of the present invention includes an RF communication unit 1310 and a control unit 1320. The control unit 1320 is callable of including a decoding determiner 1320A and a retransmission request controller 13208.

The RF communication unit 1310 is responsible for transmitting/receiving radio signals carrying data; and since the functionality of the RF communication unit 130 of the base station 520 is similar to that of the RF communication unit 1210 of the terminal 510, detailed description thereon is omitted herein. The RF communication unit 1310 delivers the uplink packet received from the terminal 510 to the control unit 1320 and transmits the HARQ feedback signal generated by the control unit 1320 to the terminal.

The control unit 1320 controls signaling among the function blocks of the base station 520 according to an embodiment of the present invention. The controller 1320 is capable of including a transmission data processor and a reception data processor like the terminal 510; and since the functionality of the control unit 1320 is similar to that of the control unit 122—of the terminal 510, detailed description is omitted herein.

Particularly, the control unit 1320 controls the entire local retransmission procedure of the present invention and, for this purpose, is capable of including the decoding determiner 1320A and the retransmission request controller 1320B.

The decoding determiner 1320A performs decoding on the uplink packet transmitted by the terminal 510 and determines the whether the decoding is successful and outputs the determination result. According to an embodiment of the present invention, if the decoding fails, the decoding determiner 1320A determines whether the uplink transmission power of the terminal 510 is equal to or greater than a threshold and outputs the determination result. The determination result is capable being used as a reference for determining whether to start the backoff timer of the terminal 510.

The retransmission request controller 1320B receives the information on whether the received packet has been decoded successfully which is output by the decoding determiner 1320A. If the received packet has been decoded successfully, the retransmission request controller 1320B controls to generate the HARQ ACK signal for receiving the next uplink packet. Otherwise, if it has failed decoding the received packet, the retransmission request controller 13208 controls to generate the local NACK (HARQ NACK) signal for packet retransmission.

According to an embodiment of the present invention, the retransmission request controller 1320B is capable of receiving, from the decoding determiner, the notification that the uplink transmission power of the terminal 510 is equal to or greater than the threshold value when decoding has failed. The retransmission request controller 1320B is capable of regarding the reason of the packet transmission failure as collision among the terminals and instructing the terminal 510 to start the backoff timer to avoid repeated collision.

According to an embodiment of the present invention, if the terminal operating in the contention-based access mode receives an HARQ NACK from the base station, the RLC retransmission is initiated such that it is possible to perform RLC retransmission immediately without waiting for the expiry of HARQ RTT as in the HARQ retransmission, resulting in reduction of packet retransmission delay.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A packet retransmission method of a terminal, the method comprising:
    transmitting an uplink packet to a base station using a first resource in a contention-based access mode;
    receiving, if the base station fails decoding the uplink packet, a message requesting for a radio link control (RLC) retransmission transmitted by the base station; and
    performing the RLC retransmission in response to the message requesting for the RLC retransmission,
    wherein the performing of the RLC retransmission comprises initializing, if the message includes information indicating that the failure to decode the uplink packet is caused by an access collision of the uplink packet, the RLC retransmission by triggering a back-off timer, and initiating, if the back-off timer expires or if the message does not include information indicating that the failure to decode the uplink packet is caused by an access collision of the uplink packet, the RLC retransmission using a second resource.

2. The method of claim 1, wherein the message requesting for the RLC retransmission comprises a Hybrid Automatic Repeat Request (HARQ) negative-acknowledgement (NACK) message.

3. The method of claim 1, wherein transmitting the uplink packet comprises suspending transmission of a next uplink packet until receiving a feedback corresponding to the uplink packet from the base station.

4. The method of claim 1, wherein initiating the RLC retransmission comprises:
    starting the back-off timer; and
    initiating, when the back-off timer expires, the RLC retransmission.

5. The method of claim 4, wherein the message requesting for the RLC retransmission comprises an indicator instructing the start of the back-off timer from the base station.

6. The method of claim 1, further comprising maintaining, after initiating the RLC retransmission, a Radio Resource Control (RRC) connection reestablishment count.

7. The method of claim 1, further comprising:
    increasing, after initiating the RLC retransmission, a retransmission count (RETX_COUNT_for_CB); and
    stopping, if the retransmission count is equal to or greater than a predetermined threshold, the retransmission.

8. A terminal for transmitting a packet to a base station, the terminal comprising:
    an RF communication unit configured to transmit and receive a signal; and
    a controller configured to:
        transmit an uplink packet to the base station using a first resource,
        receive, if the base station fails decoding the uplink packet, a message requesting for a Radio Link Control (RLC) retransmission transmitted by the base station, and
        perform the RLC retransmission in response to the message requesting for the RLC retransmission,
    wherein the performing of the RLC retransmission comprises initializing, if the message includes information indicating that the failure to decode the uplink packet is caused by an access collision of the uplink packet, the RLC retransmission by triggering a back-off timer, and initiating, if the back-off timer expires or if the message does not include information indicating that the failure to decode the uplink packet is caused by an access collision of the uplink packet, the RLC retransmission using a second resource.

9. The terminal of claim 8, wherein the message requesting for the RLC retransmission comprises a Hybrid Automatic Repeat Request (HARQ) negative-acknowledgement (NACK) message.

10. The terminal of claim 8, wherein the controller is further configured to control suspending transmission of a next uplink packet until receiving a feedback corresponding to the uplink packet from the base station.

11. The terminal of claim 8, further comprising a back-off timer controller configured to:
    start, if a back-off timer start indicator is received, the back-off timer, and
    initiate, if the back-off timer expires, the RLC retransmission.

12. The terminal of claim 8, wherein the controller is further configured to control maintaining, after initiating the RLC retransmission, a Radio Resource Control (RRC) connection reestablishment count.

13. The terminal of claim 8, wherein the controller is further configured to control increasing, after initiating the RLC retransmission, a retransmission count (RETX_COUNT_for_CB); and stopping, if the retransmission count is equal to or greater than a predetermined threshold, the retransmission.

* * * * *